Patented June 28, 1949

2,474,533

UNITED STATES PATENT OFFICE 2,474,533

PREPARATION OF CUPROUS OXIDE

Lawrence C. Klein, Hubbell, Mich., assignor to Lake Chemical Company, Calumet, Mich., a corporation of Michigan No Drawing. Application February 26, 1947, Serial No. 731,051

6 Claims. (Cl. 23—147)

This invention relates to the preparation of cuprous oxide and more specifically to the separation of cupric oxide from a mixture of cuprous and cupric oxides.

It has long been known that cupric ammonium carbonate solutions containing an excess of ammonium carbonate, will dissolve metallic copper forming cuprous ammonium carbonate. Theoretically, it would be possible for a solution containing one pound of copper as cupric ammonium carbonate, to dissolve one pound of metallic copper, and form, in solution, two pounds of copper as cuprous ammonium carbonate. In practice this rate of solution is never attained, but by exercising painstaking care it can be very nearly approached. This solution, containing most of the copper in the cuprous state, on being distilled to recover the copper value as the oxides, and, barring any oxidation in distilling, yields an oxide which is a mixture of cuprous and cupric oxides, the proportions of each being approximately the same as the cuprous to cupric copper ratio in the solution before distilling.

For several years attempts have been made at various times to produce a commercial grade of cuprous oxide by the distillation of solutions of copper ammonium carbonate that had been highly reduced to the cuprous state by contact with metallic copper. A satisfactory product has never been made by this method.

I have now found, that if the mixed oxide produced by the above method be treated with certain water-soluble organic acids or water solutions thereof (for example, acetic acid) under controlled conditions, the cupric oxide will be dissolved forming the cupric salt of the acid used, and leave undissolved, or practically so, the cuprous oxide. The cuprous oxide may be separated by filtering, washed free of acid and salts, and dried. The cupric salt may be recovered by conventional crystallization processes. The excess organic acid may be recovered by condensing the vapors evolved in concentrating the filtrate for crystallization, or by diluting it and placing it on fresh mixed oxide and allowing it to dissolve cupric oxide until practically all of the acid is consumed in forming the copper salt.

As commercially practiced, the solution circulating in the leaching system is an aqueous solution of copper ammonium carbonate, with an excess of ammonium carbonate. The copper in this solution when used for leaching is oxidized to the cupric state by air in an absorber tower. This solution is then percolated through tanks containing copper-bearing materials. The cupric ammonium carbonate solution dissolves metallic copper, thereby becoming reduced to form cuprous ammonium carbonate. Theoretically, it is possible to dissolve one pound of copper metal for every pound of copper already in solution as cupric ammonium carbonate, but this limit is never completely attained. A portion of this rich solution from the tanks, containing copper in amount equivalent to the metallic copper which was dissolved, is distilled to decompose it into copper oxides, ammonia and carbon dioxide. Ammonia stills are used for this purpose, steam entering at the bottom, and solution entering at the top. The mixed copper oxides are discharged at the bottom with waste liquor (water with a trace of ammonia). The ammonia and carbon dioxide with water vapor go to a condenser where they are cooled to form an ammonium hydroxide-ammonium carbonate solution (distillate). The undistilled portion of the rich solution, and the distillate are combined, water, carbon dioxide and aqua ammonia are added as required and this is oxidized with air to make up a new leach solution.

A typical leaching solution would contain 10 to 60, preferably 30 to 40 grams per liter, of copper (90 to 100% oxidized—that is, in the cupric state); 30 to 100, preferably about 60 grams per liter, of ammonia; and 20 to 60, preferably about 40 grams per liter, of carbon dioxide. The rich solution might in a usual case contain from 20 to 100 grams per liter of copper, with about the same concentrations of ammonia and carbon dioxide as in the leach solution. The amount of copper dissolved determines the amount of copper in the cuprous and the cupric state in the rich solution.

In practice it is possible to obtain solutions containing up to about 95 per cent of the copper in the cuprous state, which on distilling yield a mixed oxide containing up to about 92 per cent of the copper as cuprous oxide, the balance being cupric oxide. This oxide is not stable unless it is immediately dried after filtering, as the presence of moisture and a trace of ammonia probably accelerates the gradual oxidation of the cuprous oxide to cupric oxide. To prevent this oxidation, the oxide, after filtering, is immediately dried and ground in a hammer-mill with flash drier apparatus. The cuprous oxide content of the dried oxide changes to cupric oxide but slowly, thus being suitable for various commercial purposes, and it is this oxide which, unless otherwise stated, has been used in preparing cuprous oxide of a commercial grade by dissolving out the relatively small amount of cupric oxide with organic acids or solutions of organic acids. Other mixtures of cuprous oxide and cupric oxide containing predominantly cuprous oxide can be successfully treated, suitable mixtures containing at least one mol of $Cu_2O$ for each mol of $CuO$. I prefer to treat mixtures of higher $Cu_2O$ content such as those indicated above containing 70% or more by weight.

I have found that acetic acid, and various strength water solutions of acetic acid will dissolve cupric oxide from mixtures of cupric oxide and cuprous oxide leaving most of the cuprous oxide unattacked. The cuprous oxide is but slightly affected by dilute solutions of acetic acid, but considerably more so in more concentrated solutions, and in glacial acetic acid, the action of concentrated acetic acid on cuprous oxide being to precipitate one-half of the copper as finely divided copper and to dissolve the other half as cupric acetate. Practical strengths of solutions are from 5 to 50 mols of $H_2O$ per mol of acid, anhydrous basis. I prefer to use solutions of from 10 to 20 per cent (by weight) acetic acid in the process, this being optimum for fast dissolution of the cupric oxide and inexcessive attack of cuprous oxide by the acid. These strengths are based upon the idea that such solutions will be added to the dry oxide mixtures. Adding part or all the water to the oxide mixture and then adding a stronger acid solution is an equivalent procedure.

Although the cupric oxide is dissolved and a satisfactory grade of cuprous oxide may be made by allowing the reaction to proceed at room temperature, I prefer to perform the treatment at from 70° C. to the boiling point of the solution. This greatly accelerates the dissolving reaction, gives a cuprous oxide product having brighter color, and increases the solubility of the cupric acetate in the solution so that less volume of solution is required. The solution in this case must be separated from the product while hot to prevent crystallization of the cupric acetate which would occur on cooling.

The amount of acetic acid necessary to treat a given amount of mixed oxide should be the amount necessary to combine with all of the cupric oxide present, plus an excess of at least 20 per cent. I prefer to use an excess of from 100 to 200 per cent or more to produce a good grade of cuprous oxide in the minimum time. The excess acetic acid also assures the recovery of the normal cupric acetate from the liquor. The excess acid may then be recovered in one of two ways: (1) By condensing the acid when the cupric acetate solution is concentrated by evaporation; and (2) by diluting the solution with water and applying it on fresh mixed oxide to allow the excess acid to dissolve more cupric oxide until it is practically all consumed in forming cupric acetate.

The volume of solution used for the solution of the cupric oxide is of importance in that enough solution must be used to retain in solution all of the cupric acetate that is formed; otherwise the cupric acetate will start to crystallize, and on filtering will contaminate the cuprous oxide and prove difficult to wash out. This can be overcome by diluting the acid liquor with water near the end of the reaction should crystals start forming in the mixture.

Other organic fatty acids were used in the same manner as acetic acid to determine whether they had the same effect in preferentially dissolving out the cupric oxide from cuprous and cupric oxide mixtures. Those used were formic, propionic, butyric, caproic, caprylic, and lauric. While it was found that all of these acids dissolved cupric oxide quantitatively before reacting with cuprous oxide and this latter reaction taking place only very slowly, there was a decrease in their effectiveness with an increase in the number of carbon atoms in the acid. Formic acid gave the best results, and lauric acid the least satisfactory. While it is possible to produce a fair grade of cuprous oxide from the higher acids with the necessary time and pains, it is felt that only the water soluble acids are of economic importance in producing cuprous oxide by this method; viz., formic acid, acetic acid, propionic acid, and butyric acid. Butyric acid is less desirable due to its lower solubility in water, and because of the lower solubility of its copper salt. To make cuprous oxide from mixed oxide with formic, acetic, or propionic acids, the procedure is identical except that the amount of acid necessary for solution of the cupric oxide will vary as the molecular weights of the acids.

Organic acids other than the fatty acids were also tried; namely, benzoic, oxalic, lactic, gallic, tartaric, succinic, citric, and salicylic. Of these lactic acid was found to produce a fine grade of cuprous oxide by dissolving out the cupric oxide. Oxalic acid had the same effect, but the product contained cupric oxalate which had to be removed. Tartaric acid showed the desired preferential solubility for cupric oxide, but proved less desirable because of a considerably slower rate of reaction.

The cuprous oxide produced by this method is a brick red to orange color, depending on the fineness of the particles. Most of the tests were made using oxide that had been dried and ground immediately after filtering, and so retained its high cuprous oxide content. Samples of freshly precipitated wet filter cake oxide were also used. It was found that with freshly precipitated oxide the cupric oxide dissolved out more rapidly and gave a product of slightly higher cuprous oxide content; however, it was a darker red color, presumably because of the larger particle size. On grinding this material it was found that the color could be changed from brick red to lighter red, or to orange, by finer grinding.

In practicing my invention, a solution of acetic acid (10 to 20%) is placed in a vessel equipped with a reflux condenser, agitator, and a source of external heat. To this the mixed oxide is added and the mixture agitated and heated, and allowed to reflux until a sample taken from it indicates that all of the cupric oxide has dissolved and the remaining cuprous oxide is brick red in color. Should any copper acetate crystals be apparent in the sample, water is added and the agitation and heating continued until the crystals have dissolved. The solution is then filtered hot (in the absence of air), washed with warm water until free of acid and cupric acetate, and finally with cold water to cool the oxide before discharging from the filter. The oxide is then dried at 60 to 70° C. in air, or preferably in a vacuum.

The filtrate is evaporated to concentrate the cupric acetate, the vapor being condensed to recover the excess acetic acid. The cupric acetate is recovered by crystallizing.

The following specific example will serve to illustrate the invention:

*Example*

One kilogram of mixed oxide, 83.95% total copper, 78.81% cuprous oxide, was treated as follows: A solution made up of 750 ml. glacial acetic acid (99.8% HAc) and four liters of water was added to the oxide, the mixture stirred and gradually heated to a maximum temperature of 64° C. and kept at this temperature for two hours with intermittent stirring. Toward the end of this period, crystals of cupric acetate started to form on the surface of the liquid, and water was added just sufficient in amount to keep the cupric acetate in solution. The oxide after two hours was a bright red color, and was separated from the liquor by filtering on a Buchner funnel, washed free of acetates with warm water, and dried in air at 60–70° C. The oxide produced had a total copper content of 87.63 per cent, with a total reducing power as cuprous oxide of 98.30 per cent. The filtrate assayed 13.68 grams per liter copper, or approximately 39 grams per liter cupric acetate. 812 grams of cuprous oxide was obtained, or 81.2 per cent of the original material. The filtrate from the test was evaporated and the cupric acetate separated by crystallizing. The crystals assayed 31.76 per cent copper.

Having thus described my invention, what I claim is:

1. In a process for producing cuprous oxide the steps of treating a mixture of cuprous oxide and cupric oxide containing at least one mol of $Cu_2O$ for each mol of CuO with a low molecular weight, water soluble organic acid of the class consisting of formic, acetic, propionic, butyric, oxalic, tartaric and lactic acids in aqueous medium, the amount of acid being in excess of the theoretical required to react with the cupric oxide present by at least 20% and the amount of water being from 5 to 50 mols per mol of acid, anhydrous basis, until the cupric oxide has been dissolved and then separating the liquid portion of the reaction mixture from the $Cu_2O$ which remains undissolved.

2. In a process for producing cuprous oxide the steps of treating a mixture of cuprous and cupric oxides containing at least 70% by weight $Cu_2O$ with acetic acid in aqueous medium, the amount of acid being from 1.2 to 3 times the theoretical quantity required to dissolve the cupric oxide content of the mixture and the amount of water being from 5 to 50 mols of water for each mol of acid, until the cupric oxide has been dissolved and then separating the liquid portion of the reaction mixture from the $Cu_2O$ which remains undissolved.

3. In a process for producing cuprous oxide the steps of distilling a mixture of cuprous ammonium carbonate and cupric ammonium carbonate in which the copper is not less than approximately 70% in the cuprous state at a temperature to remove ammonia and $CO_2$, filtering the resulting mixture of cuprous and cupric oxides and drying the same immediately after filtering, treating the resulting mixture with a low molecular weight, water soluble organic acid of the class consisting of formic, acetic, propionic, butyric, oxalic, tartaric and lactic acids in aqueous medium, the amount of acid being in excess of the theoretical required to react with the cupric oxide present by at least 20% and the amount of water being from 5 to 50 mols per mol of acid until the cupric oxide has been dissolved and then separating the liquid portion of the reaction mixture from the $Cu_2O$ which remains undissolved.

4. In a process for producing cuprous oxide the steps of treating a mixture of cuprous and cupric oxides containing at least 70% by weight $Cu_2O$ with acetic acid in aqueous medium, the amount of acid being from 1.2 to 3 times the theoretical quantity required to dissolve the cupric oxide content of the mixture and the amount of water being from 5 to 50 mols of water for each mol of acid, until the cupric oxide has been dissolved and then separating the liquid portion of the reaction mixture from the $Cu_2O$ which remains undissolved; the treatment with said acid being carried out at a temperature between 70° C. and the boiling point of the mixture and the separation of the solid and liquid phases being carried out at a temperature above that at which crystals of cupric acetate would form.

5. In a process for producing cuprous oxide the steps of contacting a mixture of cuprous oxide and cupric oxide containing from 70% to 92% of $Cu_2O$ by weight with a low molecular weight, water soluble organic acid of the class consisting of formic, acetic, propionic, butyric, oxalic, tartaric and lactic acids in aqueous medium, the amount of acid being from 1.2 to 3 times the theoretical quantity to react with the cupric oxide present and the amount of water being a number of mols of water per mol of acid sufficient to produce a 10% to 20% solution by weight in the case of acetic acid, until the cupric oxide has been dissolved and then separating the liquid portion of the reaction mixture from the $Cu_2O$ which remains undissolved.

6. The invention according to claim 5 wherein further during the first recited step the temperature is maintained between 70° C. and the boiling point of the solution.

LAWRENCE C. KLEIN.

REFERENCES CITED

The following references are of record in the file of this patent:

Mellor, "Comprehensive Treatise On Inorganic and Theoretical Chemistry," Longmans, Green & Co., London, 1923, vol. 3, page 125, lines 3–8.